USU08676781B1

(12) United States Patent
Galperin et al.

(10) Patent No.: US 8,676,781 B1
(45) Date of Patent: Mar. 18, 2014

(54) METHOD AND SYSTEM FOR ASSOCIATING AN ADVERTISEMENT WITH A WEB PAGE

(75) Inventors: Viatcheslav Galperin, Palo Alto, CA (US); Udi Manber, Palo Alto, CA (US); Taylor Nicole Van Vleet, Menlo Park, CA (US)

(73) Assignee: A9.Com, Inc., Palo Alto, CA (US)

( * ) Notice: Subject to any disclaimer, the term of this patent is extended or adjusted under 35 U.S.C. 154(b) by 1906 days.

(21) Appl. No.: 11/255,096

(22) Filed: Oct. 19, 2005

(51) Int. Cl.
*G06Q 30/00* (2012.01)

(52) U.S. Cl.
USPC ............ 707/709; 707/707; 707/721; 707/728

(58) Field of Classification Search
USPC ......................................... 707/707, 721, 728
See application file for complete search history.

(56) References Cited

U.S. PATENT DOCUMENTS

| | | | |
|---|---|---|---|
| 5,751,956 A | 5/1998 | Kirsch | |
| 6,078,866 A | 6/2000 | Buck et al. | |
| 6,189,030 B1 | 2/2001 | Kirsch et al. | |
| 6,269,361 B1 * | 7/2001 | Davis et al. ........................ | 707/3 |
| 6,631,372 B1 | 10/2003 | Graham | |
| 6,778,975 B1 | 8/2004 | Anick et al. | |
| 6,826,572 B2 | 11/2004 | Colace et al. | |
| 6,876,997 B1 | 4/2005 | Rorex et al. | |
| 6,907,566 B1 | 6/2005 | McElfresh et al. | |
| 7,225,182 B2 * | 5/2007 | Paine et al. .................... | 707/709 |
| 2002/0004735 A1 | 1/2002 | Gross | |
| 2002/0147634 A1 | 10/2002 | Jacoby et al. | |
| 2003/0033292 A1 | 2/2003 | Meisel et al. | |
| 2003/0046159 A1 | 3/2003 | Ebrahimi et al. | |
| 2003/0050863 A1 | 3/2003 | Radwin | |
| 2003/0055816 A1 * | 3/2003 | Paine et al. ........................ | 707/3 |
| 2003/0056213 A1 | 3/2003 | McFaddin et al. | |
| 2003/0101126 A1 | 5/2003 | Cheung et al. | |
| 2003/0149937 A1 | 8/2003 | McElfresh et al. | |
| 2003/0149938 A1 | 8/2003 | McElfresh et al. | |
| 2003/0220866 A1 * | 11/2003 | Pisaris-Henderson et al. . | 705/37 |
| 2003/0220918 A1 | 11/2003 | Roy et al. | |
| 2003/0229542 A1 | 12/2003 | Morrisroe | |
| 2004/0015397 A1 | 1/2004 | Barry et al. | |
| 2004/0019523 A1 | 1/2004 | Barry et al. | |
| 2004/0039733 A1 | 2/2004 | Soulanille | |
| 2004/0044571 A1 * | 3/2004 | Bronnimann et al. .......... | 705/14 |
| 2004/0103024 A1 | 5/2004 | Patel et al. | |
| 2004/0117259 A1 | 6/2004 | Morrisroe et al. | |
| 2004/0138956 A1 | 7/2004 | Main et al. | |
| 2004/0148222 A1 * | 7/2004 | Sabella et al. ................... | 705/14 |
| 2004/0167845 A1 | 8/2004 | Corn et al. | |
| 2004/0186769 A1 | 9/2004 | Mangold et al. | |
| 2004/0204983 A1 | 10/2004 | Shen et al. | |
| 2004/0249709 A1 | 12/2004 | Donovan et al. | |
| 2004/0260689 A1 | 12/2004 | Colace et al. | |
| 2005/0004835 A1 | 1/2005 | Roslansky et al. | |
| 2005/0021395 A1 | 1/2005 | Luu | |

(Continued)

*Primary Examiner* — John Van Bramer
*Assistant Examiner* — Stacie Gatling
(74) *Attorney, Agent, or Firm* — Lee & Hayes, PLLC

(57) ABSTRACT

A method and system for associating an advertisement with a web page are disclosed. Web pages associated with potential queries may be identified using a search engine. A mapping operation may be performed to obtain a map of the web pages as a function of the potential queries. A reverse mapping operation may be performed to obtain a grouping of potential queries as a function of one of the web pages. An active query may be selected from the grouping of potential queries to provide to an advertising service to associate an advertisement with the web page.

33 Claims, 7 Drawing Sheets

(56) References Cited

U.S. PATENT DOCUMENTS

| | | |
|---|---|---|
| 2005/0027594 A1 | 2/2005 | Yasnovsky et al. |
| 2005/0049915 A1 | 3/2005 | Mehta et al. |
| 2005/0055269 A1 | 3/2005 | Roetter et al. |
| 2005/0065844 A1 | 3/2005 | Raj et al. |
| 2005/0071218 A1 | 3/2005 | Lin et al. |
| 2005/0071224 A1 | 3/2005 | Fikes et al. |
| 2005/0080775 A1* | 4/2005 | Colledge et al. .................. 707/3 |
| 2005/0096979 A1 | 5/2005 | Koningstein |
| 2005/0131758 A1 | 6/2005 | Desikan et al. |
| 2005/0131762 A1 | 6/2005 | Bharat et al. |
| 2005/0137939 A1* | 6/2005 | Calabria et al. ................. 705/26 |
| 2005/0144064 A1* | 6/2005 | Calabria et al. ................. 705/14 |
| 2005/0144069 A1 | 6/2005 | Wiseman et al. |
| 2005/0144073 A1 | 6/2005 | Morrisroe et al. |
| 2005/0149396 A1* | 7/2005 | Horowitz et al. ................ 705/14 |
| 2005/0216335 A1 | 9/2005 | Fikes et al. |
| 2005/0228797 A1* | 10/2005 | Koningstein et al. ......... 707/100 |
| 2005/0278443 A1* | 12/2005 | Winner et al. ................. 709/224 |
| 2006/0095281 A1* | 5/2006 | Chickering et al. ............... 705/1 |
| 2006/0265399 A1* | 11/2006 | De Filippi ........................ 707/10 |
| 2007/0027753 A1* | 2/2007 | Collins ........................... 705/14 |
| 2007/0156621 A1* | 7/2007 | Wright et al. .................... 706/48 |

* cited by examiner

| | |
|---|---|
| Q1 | P1, P2, P3, P4, P5 |
| Q2 | P2, P4, P6, P7, P8 |
| Q3 | P1, P2, P5, P7, P8 |
| Q4 | P1, P2, P3, P4, P5 |
| Q5 | P1, P3, P4, P6, P8 |

FIG. 3

| | |
|---|---|
| P1 | Q1, Q3, Q4, Q5 |
| P2 | Q1, Q2, Q3, Q4 |
| P3 | Q1, Q4, Q5 |
| P4 | Q1, Q2, Q4, Q5 |
| P5 | Q1, Q4 |
| P6 | Q2, Q5 |
| P7 | Q2, Q3 |
| P8 | Q2, Q3, Q5 |

FIG. 4

| | | | | | |
|---|---|---|---|---|---|
| P1 | www.store.com/product1.html | Q1=bicycle | Q3=racing | Q4=sport | Q5=triathalon |
| P2 | www.store.com/product2.html | Q1=bicycle | Q2=mountain bike | Q3=racing | Q4=sport |
| P3 | www.store.com/product3.html | Q1=bicycle | Q4=sport | Q5=triathalon | |
| P4 | www.store.com/product4.html | Q1=bicycle | Q2=mountain bike | Q4=sport | |

Sponsored Link 1
www.sponsoredlink1.org
Keywords=bicycle, triathalon

Sponsored Link 2
www.sponsoredlink2.com
Keywords=bicycle, sport

Sponsored Link 3
www.sponsoredlink3.com
Keywords=mountain bike, racing

FIG. 5

METHOD AND SYSTEM FOR ASSOCIATING AN ADVERTISEMENT WITH A WEB PAGE

BACKGROUND

A common advertising model utilized on the Internet, in particular with search engine websites, involves a system of providing sponsored links. Sponsored links are paid advertisements that appear in addition to search results when users input keywords at search engine websites. For example, if a visitor to the search engine website enters the term "flowers," advertisements that an advertiser believes may be relevant to someone searching for flowers are displayed with particular search results. The advertisements appear as a result of advertisers bidding on particular keywords, such as "flowers." If multiple advertisers place bids on the same keyword, it is common for advertisements with the highest bids to be displayed when a visitor enters a search term that matches the keyword. Oftentimes, there is no limit on the number of search terms a particular advertiser may bid on.

The bidding process is commonly managed by an intermediary, such as a search engine website. Advertisers bid on keywords and submit advertisements associated with the keywords to the intermediary. The intermediary typically utilizes one or more databases for storing the advertisements, associating the advertisements with bids and keywords, keeping track of the highest bidders, scheduling, etc., and ensuring that at any given instance the advertisements corresponding to the highest bids are displayed when search terms matching the keywords are entered by the visitors to the search engine website. Whenever a visitor clicks on a displayed advertisement, the intermediary charges the advertiser a fee. The intermediary also commonly monitors the "click-through" rate (e.g., how many users actually select or click on the displayed advertisement). In some cases, if the number of visitors clicking on the advertisement is too low, the advertisement will no longer be displayed, even if it is associated with the highest bid.

Another variation of the above-described concept is to show the keyword-based advertisements on websites other than search engines' search result sites. For example, if a website contains information about flowers, then it is likely that visitors viewing the website may have an interest in advertisements related to flowers. Thus, the intermediary may provide special programs to which publishers of websites can subscribe. In such a program, the intermediary analyzes the publisher's website to determine a suitable keyword or set of keywords to be associated with the website, such as "flowers" in the above example. The intermediary selects from its database the highest bidder on the determined keyword or keywords and provides the appropriate advertisements for the publisher's website. This type of advertising program is beneficial to the publisher, since the publisher is not required to take action other than display the advertisements and collect monetary compensation for displaying the advertisements. The publisher may also receive monetary compensation each time a visitor of the website clicks on the displayed advertisement. This compensation model is often referred to as "pay per click."

In some situations, the process of determining a suitable keyword or set of keywords to be associated with a website can be difficult, and often may not produce keyword advertisements that benefit visitors. In particular, a website may provide individual web pages containing content for a wide variety of subjects and that are typically accessed either without the use of keywords or with keywords that may not be helpful to determine appropriate advertisements for display on these web pages. For example, a publisher's website may contain web pages providing detailed information about various individual books for sale. The individual words taken from book titles often do not reflect the subject matter of the book to a degree that a meaningful selection of keyword advertisements may be provided for publication with the individual book detail web pages if these words are used as keywords to be associated with these web pages. It would be beneficial to provide a method and system for associating an advertisement with a web page that enables determination of keywords or set of keywords to be associated with individual web pages so that the associated keyword advertisements may provide greater benefit for visitors and maximize potential revenues for the intermediary.

SUMMARY

One embodiment relates to a method of associating an advertisement with a web page. The method includes identifying web pages associated with potential queries using a search engine, performing a mapping operation to obtain a map of the web pages as a function of the potential queries, performing a reverse mapping operation obtain a grouping of potential queries as a function of one of the web pages, and selecting an active query from the grouping of potential queries to provide to an advertising service to associate an advertisement with the web page.

Another embodiment relates to a system for associating an advertisement with a web page. The system includes a search engine configured to identify web pages associated with potential queries, a mapping engine configured to determine a grouping of the potential queries associated with one of the web pages, an optimization engine configured to select an active query from the grouping of potential queries to associate an advertisement with the web page, and a web server configured to provide the web page in response to a request for the web page, wherein the web page includes an advertisement provided from an advertisement database based on the active query.

Another embodiment relates to a method of associating an advertisement with a web page. The method includes providing potential queries as inputs to a search engine, receiving a list of associated web pages for each potential query and a relevance score for each of the associated web pages, determining a grouping of the potential queries associated with one of the web pages, and assigning a weight to each of the potential queries based on a performance metric for each of the potential queries. The weight determines a number of requests for the web page for which the potential query is active. The performance metric is based on the relevance score. The method also includes alternately selecting an active query from the grouping of potential queries based on the assigned weights to associate an advertisement with the web page.

Another embodiment relates to a system for associating an advertisement with a web page. The system includes a search engine configured to receive potential queries as inputs and to provide a list of associated web pages for each potential query and a relevance score for each of the associated web pages, a mapping engine configured to determine a grouping of the potential queries associated with one of the web pages, an optimization engine configured to select an active query from the grouping of potential queries to associate an advertisement with the web page, a communication network coupled to an advertisement database and a web server for providing the advertisement for publication with the web page based on the active query in response to a request for the web page, and a searchable database configured to facilitate identification of past queries submitted to the search engine by users and corresponding search result web pages, and further configured to facilitate selection of the potential queries based on whether the corresponding search result web pages include advertisements.

Another embodiment relates to a method of associating an advertisement with a web page. The method includes determining a grouping of potential queries associated with a web page, and assigning a weight to each of the potential queries based on a performance metric for each of the potential queries using an optimization engine. The weight determines a number of requests for the web page for which the potential query is active. The method also includes alternately selecting an active query from the grouping of potential queries based on the assigned weights to associate an advertisement with the web page, obtaining an advertisement to provide with the web page based on the active query, measuring an actual click-through-rate for each of the potential queries, and adjusting the weights for each potential query based on the performance metric.

Another embodiment relates to a method of associating an advertisement with searchable content. The method includes identifying searchable content items associated with potential queries using a search engine, performing a mapping operation to obtain a map of a grouping of the searchable content items as a function of the potential queries, performing a reverse mapping operation obtain a grouping of potential queries as a function of one of the searchable content items in the grouping of searchable content items, and selecting an active query from the grouping of potential queries to provide to an advertising service to associate an advertisement with the searchable content item.

BRIEF DESCRIPTION OF THE DRAWINGS

FIG. 3 is a chart that illustrates the relationship between potential queries submitted to the search engine of FIG. 1 and the associated web pages as determined by the mapping engine of FIG. 1 according to an exemplary embodiment;

FIG. 4 is a chart that illustrates the relationship between each of the associated web pages and the potential queries after the reverse mapping process of the mapping engine of FIG. 1;

FIG. 5 is a chart that illustrates the relationship between the active query associated with a web page and keywords associated with an advertisement according to an exemplary embodiment;

DETAILED DESCRIPTION OF EXEMPLARY EMBODIMENTS

Figure 1:
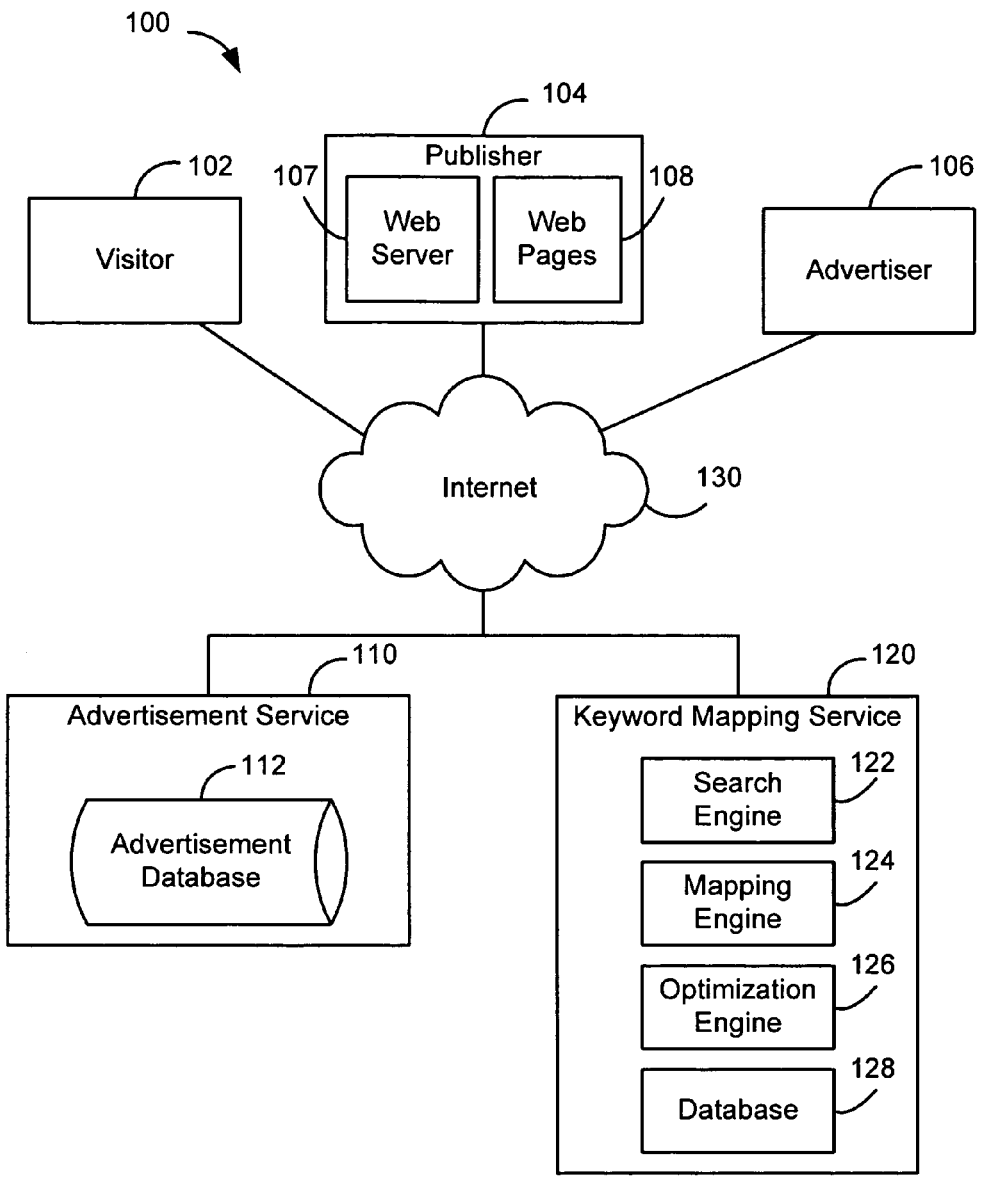
FIG. 1 is a block diagram that schematically illustrates a system for associating an advertisement with a web page according to an exemplary embodiment.

FIG. 1 illustrates a system 100 for associating an advertisement with a web page according to an exemplary embodiment. System 100 includes one or more web site visitors 102, one or more web site publishers 104, one or more web site advertisers 106, an advertisement service 110, and a keyword mapping service 120. Visitors 102, publishers 104, and advertisers 106 may each include one or more computers which are connected to each other by way of a communication network 130, such as the Internet. System 100 is generally configured to allow visitors to view websites made available by publishers 104 (e.g., a website including web server 107 and associated web pages 108) and advertisements provided by advertisers 106 (e.g., advertisements provided to advertisement service 110 and stored in advertisement database 112) via communication network 130. In particular, system 100 is configured to associate web pages made available by publishers 104 with advertisements provided by advertisers 106 using keyword mapping service 120.

Advertisement service 110 may include an advertisement database 112 that stores advertisements provided by advertisers 106. For each advertisement, advertisement database 112 may also store other information, such as bids made on one or more appropriate keywords by an advertiser 106 associated with the advertisement. The bids may indicate a maximum that each advertiser 106 is prepared to pay in response to a visitor 102 selecting the advertisement from a web page where the advertisement is published based on the associated keyword. Each of the advertisements may thus be linked to or associated with one or more keywords, a bid associated with the advertisement/keyword, and other information.

Keyword mapping service 120 may include a search engine 122, a mapping engine 124, and an optimization engine 126. Keyword mapping service 120 may also include a database 128 associated with search engine 122. Keyword mapping service 120 is generally configured to select one or more keywords for associating web pages made available by publishers 104 with advertisements provided by advertisers 106. In the illustrated embodiment, keyword mapping service 120 is shown separate from advertising service 110 and publishers 104. According to another exemplary embodiment, keyword mapping service 120 may be integrated with website publisher 104. According to yet another exemplary embodiment, keyword mapping service 120 may be integrated with advertising service 110.

Search engine 122 may be any program configured to retrieve data, files, or documents from a database or network, such as the Internet, based on search terms entered by, for example, a visitor 102 or other user of a search engine website. According to an exemplary embodiment, search engine 122 may be a product search engine associated with a website of a publisher 104. For purposes of this example, it is assumed that the website of publisher 104 is integrated with keyword mapping service 120. In this embodiment, search engine 122 may be used by visitors for searching the website of publisher 104, which may provide individual web pages 108 containing content for a wide variety of subjects (e.g., products, services, etc.).

In some situations, web pages 108 may be accessed by a visitor 102 either without the use of search terms (e.g., search terms entered into the product search engine 122 by the visitor to access the content-based web pages 108) or with search terms entered by the visitor 102 that may not be helpful to determine appropriate advertisements for display on the web pages 108 (such as may be the case with the title of a book, movie, musical recording, etc). Search engine 122 may be configured within keyword mapping service 120 to facilitate the evaluation of potential queries, such as keyword queries, to be used to associate advertisements with web pages 108 in such situations. The potential queries are possible candidates for queries to be used in place of search terms provided by a visitor 102 to associate advertisements with a particular content-based web page 108 when the particular content-based web page is requested by the visitor 102. For example, once selected, such potential queries may be provided in the form of keywords to advertisement service 110 to obtain advertisements to be published with the content-based web page. The advertisements may be in the form of sponsored links paid for by third parties and published on the website of the publisher 104 as an alternative means of generating revenue.

Figure 2:
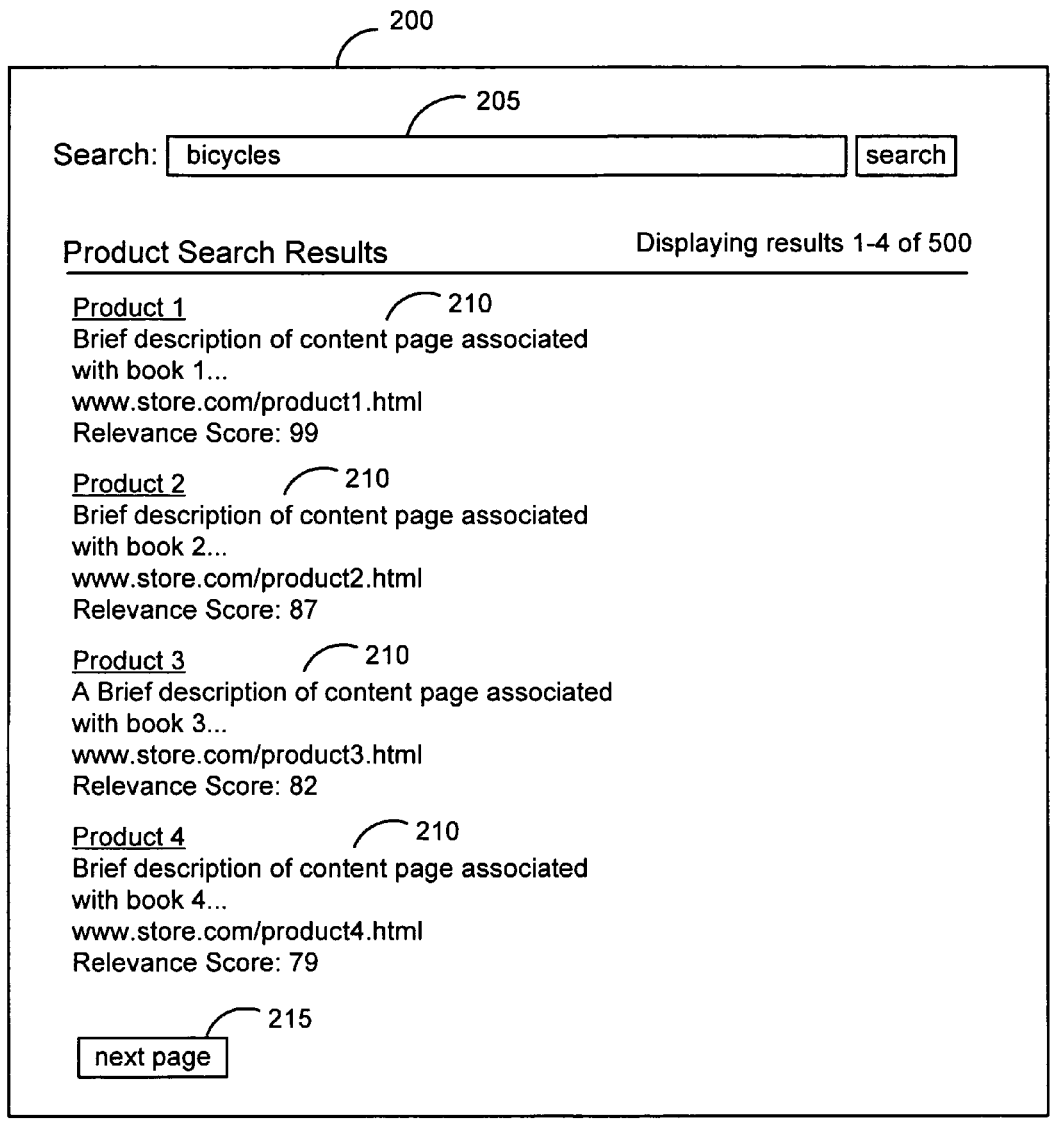
FIG. 2 is a screen shot that illustrates a search results web page according to an exemplary embodiment.

When the search engine 122 is provided with one or more search terms from a visitor 102, the results of the search may be provided by search engine 122 in the form of data, such as data for a search results web page, which may include a listing of websites and/or content-based web pages 108 associated with the search term. FIG. 2 illustrates a search results web page 200 displayed using search results data from search engine 122 according to an exemplary embodiment. While the search results data provided by search engine 122 is generally described with reference to FIG. 2 in the context of a displayable search results web page, it will be understood that the search results data may be provided in other forms, such as, for example, a direct data input to mapping engine 124 or another component of system 100.

In the illustrated embodiment, search engine 122 has executed a Web search for the search term "bicycles" in field 205 and has provided a set of hyperlinks 210 to content-based web pages 108 regarding products associated with the search term "bicycles." In this embodiment, hyperlinks 210 may represent web pages 108 providing detailed information about various individual products for sale, and the search term "bicycles" may represent a potential query, such as a keyword query, from one of many possible sources that may be evaluated by keyword mapping service 120 as a candidate for associating advertisements with the web pages 108 in the absence of meaningful search terms entered by the visitor 102 to access the content of the web pages 108. A subset of the resulting hyperlinks 210 are displayed along with a button 215 to allow the next set of search results to be accessed.

Search engine 122 may also provide a relevance score for each of hyperlinks 210 indicating the degree to which each web page 108 represented by a hyperlink 210 is associated with the potential query "bicycles." For example, in the illustrated embodiment, hyperlinks 210 are listed in order of relevance to the potential query "bicycles." Product 1 has an associated relevance score of 99, indicating a high degree of relevance, while Product 4 has an associated relevance score of 79, indicating a lower degree of relevance. According to various exemplary embodiments, the relevance scores may be provided using any suitable format or scale, as well as using any number of criteria for determining relevance.

Keyword mapping service 120 may be configured to evaluate several potential queries from multiple sources to optimize the selection of potential queries. According to an exemplary embodiment, keyword mapping service 120 includes a database 128 associated with search engine 122 that may be searched to identify search terms submitted by users in the past and the corresponding search result web page logs. Keyword mapping service 120 may be configured to conduct a search of the corresponding search result web page logs to identify search terms that provided a particular type of result. For example, keyword mapping service 120 may search database 128 to identify search terms submitted by users in the past that resulted in at least one associated advertisement presented in the form of a sponsored link according to the corresponding search result web page logs. Keyword mapping service 120 may then further search the corresponding search result web page logs to identify those search terms that resulted in at least one associated advertisement presented in the form of a sponsored link, where there was a click on the sponsored link, a particular click-through-rate associated with the sponsored link, etc. The search terms identified by the search of database 128 may then be used as potential queries to be submitted to search engine 122 for evaluation.

For each of the potential queries identified and submitted to search engine 122 for evaluation, search engine 122 may identify web pages 108 associated with the potential query and provide a list of the associated web pages 108 including a relevance score for each. According to an exemplary embodiment, the individual web pages 108 may be ranked within the list of associated web pages 108 based on, for example, the relevance score, or other suitable factors. In this embodiment, keyword mapping service 120 may be configured to retain only a certain number of the web pages 108 identified in the list for further analysis, such as the top N web pages 108 according to the ranking within the list of associated web pages 108. For example, for each of the potential queries identified and submitted to search engine 122 for evaluation, keyword mapping service 120 may be configured to retain the top ten web pages 108 according to the ranking within the list of associated web pages 108.

Mapping engine 124 may be configured to determine a grouping of the potential queries associated with one or more of the web pages 108 identified by search engine 122. According to an exemplary embodiment, mapping engine 124 may be configured to perform a mapping operation to obtain a map of the web pages 108 identified by search engine 122 as a function of each potential query, and then to perform a reverse mapping operation to obtain groupings of potential queries as a function of each individual web page 108 identified by search engine 122, rather than the individual web pages 108 being grouped as a function of each potential query.

FIGS. 3 and 4 are charts that illustrate the reverse mapping operation performed by mapping engine 124 according to an exemplary embodiment. FIG. 3 illustrates the relationship between potential queries submitted to search engine 122 and the resulting web pages as determined by mapping engine 124. As shown in FIG. 3, five potential keyword queries, Q1-Q5 were submitted to search engine 122 and the top five web pages according to the ranking within the resulting list of associated web pages 108 were retained for analysis for each potential query. For example, a search for potential query Q1 resulted in associated web pages P1-P5. A search for potential query Q2 resulted in associated web pages P2, P4, and P6-P8. A search for potential query Q3 resulted in associated web pages P1, P2, P5, P7, and P8. A search for potential query Q4 also resulted in associated web pages P1-P5. A search for potential query Q5 resulted in associated web pages P1, P3, P4, P6, and P8. FIG. 4 illustrates the relationship between each of the associated web pages P1-P8 identified by search engine 122 and potential queries Q1-Q5 after the reverse mapping process. As shown in FIG. 4, each grouping of potential queries is a function of each individual web page identified by search engine 122, rather than the individual web pages being grouped as a function of each potential query. For example, the grouping of potential queries associated with web page P1 includes Q1, Q3, Q4, and Q5, the grouping of potential queries associated with web page P2 includes Q1, Q2, Q3, and Q4, and so on.

Optimization engine 126 may be configured to select an active query from the associated grouping of potential queries identified by mapping engine 124 for one or more of the web pages 108. The active query may be used to associate an advertisement with the web page 108, e.g., by submitting the active query to advertisement service 110 and receiving the advertisement in response. According to an exemplary embodiment, optimization engine 126 may be configured to assign a weight to each potential query in a grouping of potential queries in order to facilitate selection of the active query. The weights may determine a number of requests for the web page 108 for which the potential query is active, and the active query may then alternate among submitting each of the potential queries in the grouping of potential queries according to the weights assigned to each potential query.

The weights may be assigned according to any suitable factors. For example, the weights may be assigned based on performance metrics, such as an estimated financial performance, for each of the potential queries in a grouping of potential queries in order to maximize the revenue generated by the advertisements associated with the active query. According to an exemplary embodiment, the weights may be assigned according to the relevance score provided by search engine 122 for each of the potential queries in a grouping of potential queries. In this embodiment, the relevance score provided by search engine 122 for each of the potential queries in a grouping of potential queries may be used as a click-through-rate prediction factor for advertisements associated with each potential query in the grouping of potential queries. The click-through-rate prediction factor may be combined with, for example, an estimated cost-per-click (e.g., an estimated or average bid from advertisers 106 providing ads associated with the potential query) to determine an estimated financial performance or other performance metric and assign the weights to each potential query in the grouping of potential queries.

By way of example, assume that the each of the potential queries in the grouping of potential queries associated with web page P1 as shown in FIG. 4 are provided the following relevance scores by search engine 122: Q1=100, Q3=90, Q4=80; and Q5=70. If each of potential queries Q1, Q3, Q4, and Q5 has an estimated cost-per-click of ten cents per click (i.e., equal value), optimization engine 126 may assign weights to each potential query based on the decreasing trend in the relevance scores from Q1 to Q4 such that Q1 is the active query for approximately 29 out of every 100 requests for web page P1, Q3 is the active query for approximately 26 out of every 100 requests for web page P1, Q4 is the active query for approximately 24 out of every 100 requests for web page P1, and Q5 is the active query for approximately 21 out of every 100 requests for web page P1. If the cost-per-click varies for each potential query, then the relative number of times that potential query is the active query may vary in accordance with the cost-per-click values. Of course, many other factors and combinations of factors may be used to assign the weights to each potential query in the grouping of potential queries.

Optimization engine 126 may be further configured to track a performance metric for each active query over a period of time, including, for example, the actual financial performance of each active query. According to an exemplary embodiment, optimization engine 126 may be configured to measure an actual click-through-rate for each active query and combine the actual click-through-rate with the estimated or average cost-per-click for each active query in order to update the estimated financial performance. The weights assigned to each potential query in the grouping of potential queries associated with the web page are then adjusted to reflect the updated financial performance as modified by the actual click-through-rates. In this way, the total estimated revenue generated by the each potential query as it becomes active may be optimized.

Queries that fail to meet certain performance standards over time may be eliminated. For example, according to an exemplary embodiment, queries that fail to be associated with any advertisements over a predetermined period of time may be eliminated. According to another exemplary embodiment, queries that fail to be associated with advertisements that receive a certain minimum number of click-throughs over a predetermined period of time may be eliminated.

Each active query may be used to associate advertisements with a publisher's web page associated with the active query. According to an exemplary embodiment, each of the advertisements stored in advertisement database 112 may be linked to or associated with one or more keywords, and each active query associated with a web page 108 may comprise a keyword query that may be used to associate advertisements in advertisement database 112 with the web page 108 when the web page is requested from web server 107 by a visitor to the website of a publisher 104. For example, FIG. 5 is a chart that illustrates the relationship between the active query associated with a web page and keywords associated with an advertisement. As shown in FIG. 5, P1 is the web page at www.store.com/product1.html, which may be a content page providing detailed information about Product 1, a product that may be for sale at the website of a publisher 104 (e.g., an online retailer). Web page P1 is associated with potential queries Q1, which is the keyword "bicycle," Q3, which is the keyword "racing," Q4, which is the keyword "sport," and Q5, which is the keyword "triathlon." When Q1 is the active query for web page P1, a request from a visitor 102 for www.store.com/product1.html will retrieve web page P1 for publication to the visitor 102. The request from visitor 102 for www.store.com/product1.html will also launch a query to advertising database 112 based on the active query "bicycle," which will retrieve Sponsored Link 1 and Sponsored Link 2 from advertising database 112 for publication to the visitor 102 with web page P1 because these advertisements are both associated with the keyword "bicycle." Sponsored Link 3 is not retrieved for publication with web page P1 because it is not associated with the keyword "bicycle."

Figure 6:
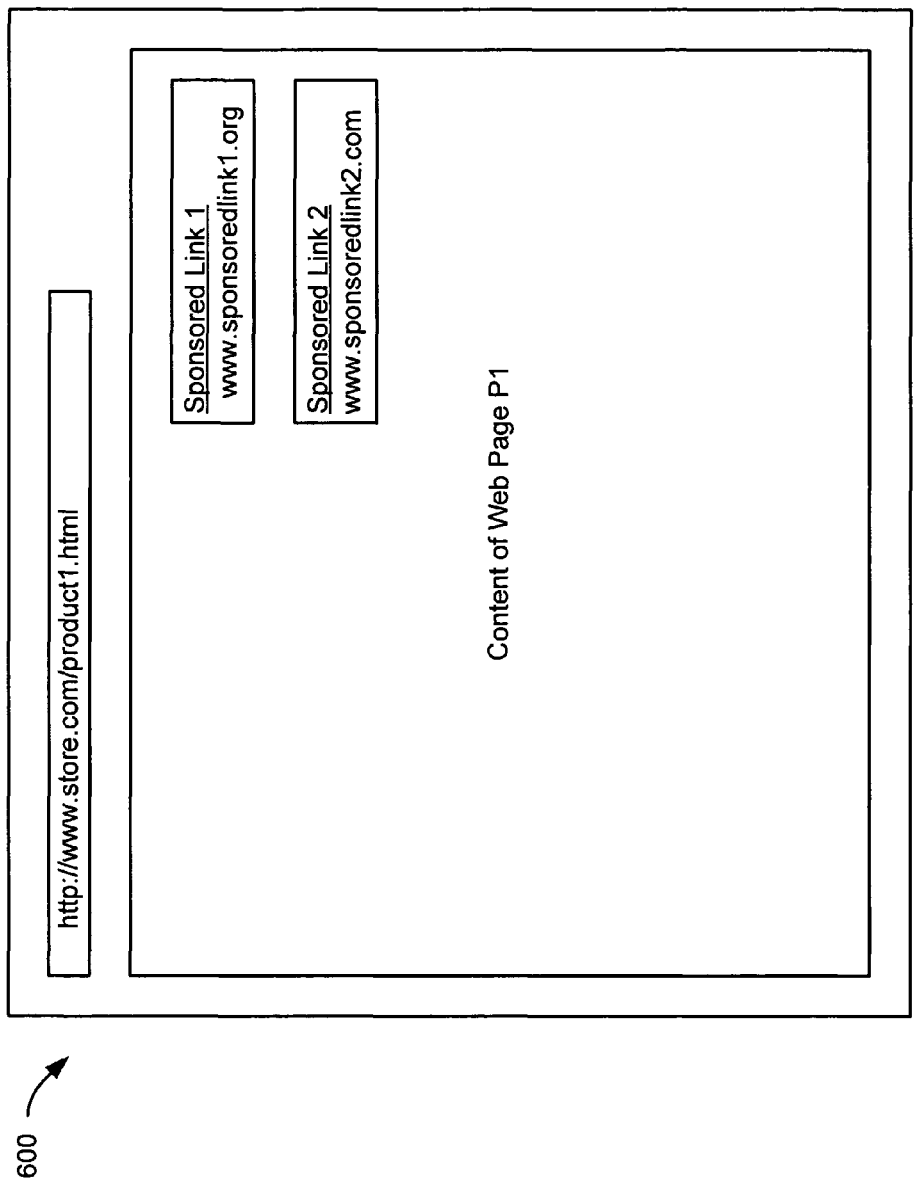
FIG. 6 is a screen shot showing a web page with associated advertisements according to an exemplary embodiment.

FIG. 6 is an example of a publisher's web page as displayed in the web browser 600 of the visitor 102 with the associated advertisements. As shown in FIG. 6, the web page P1 is requested and downloaded in the visitor's browser in a conventional manner by typing in the address of the web page, www.store.com/product1.html, in an address field of the web browser. The web page contains the content of web page P1 as provided by publisher 104 in response to the request for web page P1. On the right side of web page P1, Sponsored Link 1 and Sponsored Link 2 are displayed in response to the active query for advertisements in advertisement database 112 associated with the keyword "bicycle." Such advertisements may be third party advertisements that the publisher (e.g., an online retailer) has provided to visitors 102 as an alternative way of generating revenue.

Figure 7:
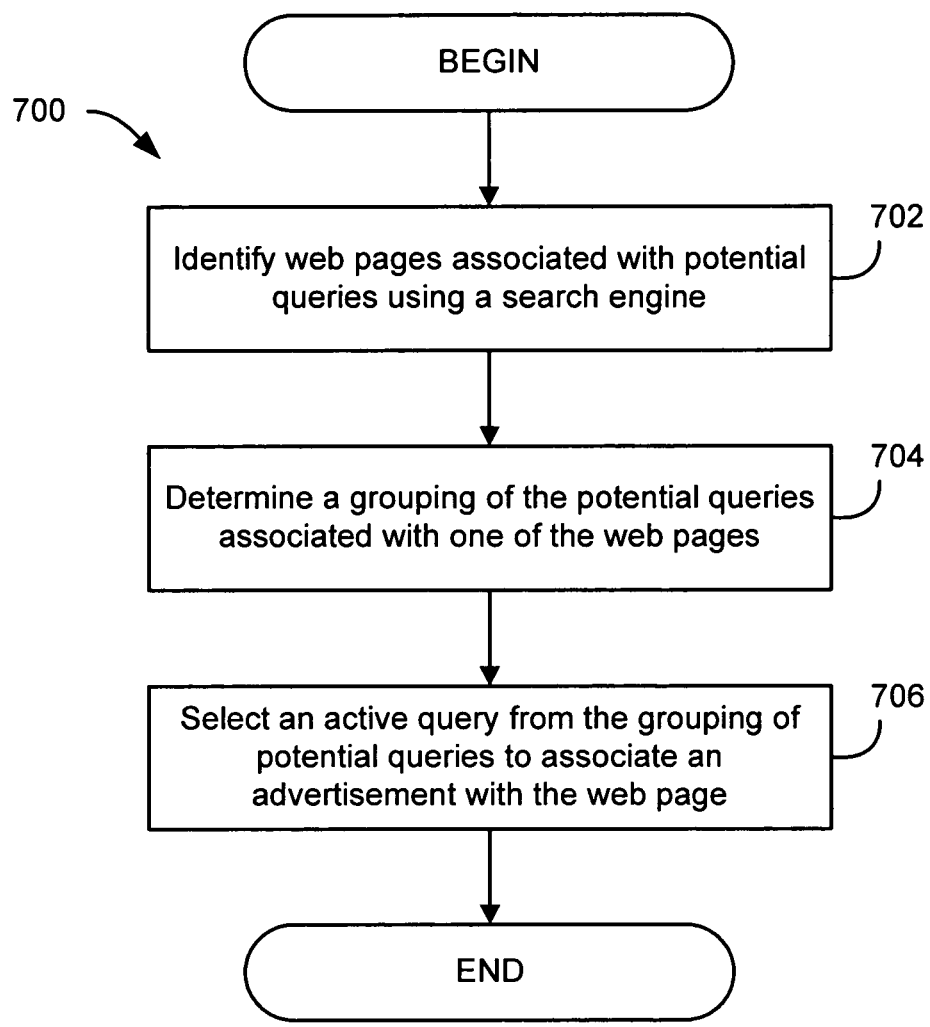
FIG. 7 is a flow diagram that shows a method of associating an advertisement with a web page using the system of FIG. 1 according to an exemplary embodiment.

FIG. 7 is a flow diagram that shows a method 700 of associating an advertisement with a web page using system 100 according to an exemplary embodiment. Some aspects of the operation described in connection with FIG. 7 have previously been described above. The method 700 begins with a step 702. At step 702, web pages associated with potential queries are identified using search engine 122. The potential queries may be, for example, keyword queries that are entered into search engine 122 to identify content-based web pages 108 related to products and/or services available at the websites of purchasers 104. According to an exemplary embodiment, database 128 may be used to facilitate identification of past queries submitted to search engine 122 by users and corresponding search result web pages. The potential queries may be selected based on whether the past queries resulted in at least one associated advertisement presented in the form of a sponsored link, wherein there was a click on the sponsored link, a particular click-through-rate associated with the sponsored link, etc.

At a step 704, a grouping of associated potential queries is determined using mapping engine 124 for one or more of the web pages 108 identified at step 702. According to an exemplary embodiment, mapping engine 124 performs a mapping operation to map the web pages 108 identified by search engine 122 in step 702 as a function of each potential query, and then performs a reverse mapping operation to obtain a grouping of potential queries as a function of each individual web page 108 identified by search engine 122, rather than the individual web pages 108 being grouped as a function of each potential query.

At a step 706, an active query is selected from the grouping of potential queries. The active query may be used to associate one or more advertisements with the associated web page 108. According to an exemplary embodiment, each of the advertisements stored in advertisement database 112 may be linked to or associated with one or more keywords, and each active query associated with a web page 108 may comprise a keyword query that may be used to associate advertisements in advertisement database 112 with the web page 108 when the web page is requested from web server 107 by a visitor to the website of a publisher 104.

Figure 8:
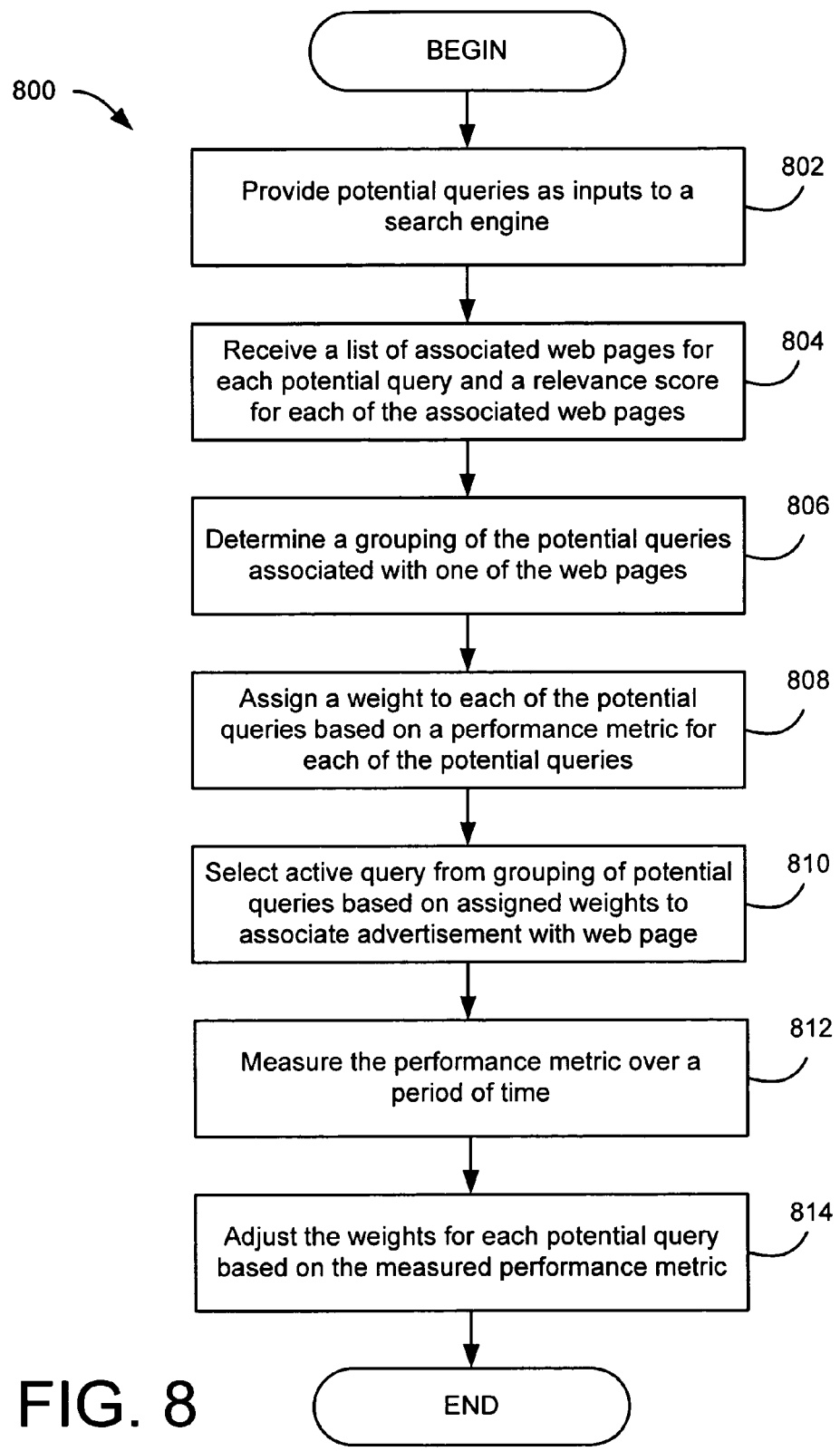
FIG. 8 is a flow diagram that shows a method of associating an advertisement with a web page using the system of FIG. 1 according to another exemplary embodiment.

FIG. 8 is a flow diagram that shows a method 800 of associating an advertisement with a web page using system 100 according to another exemplary embodiment. Method 800 shown in FIG. 8 is generally similar to method 700 shown in FIG. 7, except that method 800 provides additional details according to an exemplary embodiment.

Method 800 begins with a step 802. At step 802, potential queries are provided as inputs to search engine 122, and at a step 804, a list of associated web pages 108 for each potential query and a relevance score for each of the associated web pages 108 is received. At a step 806, a grouping of associated potential queries is determined using mapping engine 124 for one or more of the web pages 108 identified at step 804.

At a step 808, a weight is assigned to each of the potential queries based on a one or more performance metrics, such as an estimated financial performance for each of the potential queries. The weight may determine a number of requests for the web page 108 for which the potential query is active, and the performance metric may be based on the relevance score determined in step 804. According to an exemplary embodiment, the relevance score provided by search engine 122 for each of the potential queries in a grouping of potential queries may be used as a click-through-rate prediction factor for advertisements associated with each potential query in the grouping of potential queries. The click-through-rate prediction factor may be combined with, for example, an estimated cost-per-click (e.g., an estimated or average bid from advertisers 106 providing ads associated with the potential query) to determine an estimated financial performance and assign the weights to each potential query in the grouping of potential queries.

At a step 810, an active query is alternately selected from the grouping of potential queries based on the assigned weights. The active query may be used to associate one or more advertisements with the associated web page 108. According to an exemplary embodiment, each of the advertisements stored in advertisement database 112 may be linked to or associated with one or more keywords, and each active query associated with a web page 108 may comprise a keyword query that may be used to associate advertisements in advertisement database 112 with the web page 108 when the web page is requested from web server 107 by a visitor to the website of a publisher 104.

At a step 812, the performance metric is measured over a period of time, and at a step 814, the weights assigned to each potential query in the grouping of potential queries associated with the web page are then adjusted to reflect the measured performance. According to an exemplary embodiment, an actual click-through-rate is measured for advertisements associated with each active query. The actual click through rate is combined with the estimated or average cost-per-click for each active query in order to update the estimated financial performance. The weights assigned to each potential query in the grouping of potential queries associated with the web page are then adjusted at step 814 to reflect the updated financial performance as modified by the actual click-through-rates.

As mentioned above, keyword mapping service 120 may be integrated with advertising service 110 such that a single entity provides both services according to an exemplary embodiment. In this embodiment, search engine 122 may be a more general search engine that provides a listing of search results based on web pages from multiple websites. In this embodiment, a publisher 104 may identify web pages for which it would like to have an associated set of potential queries identified. The publisher may provide the identification of such web pages to the keyword mapping service 120, which may in turn generate a list of keyword queries that return the web pages identified by the publisher 104. Such keyword queries may be provided to the publisher 104 as potential queries. The potential queries may also be optimized in the manner described above, for example, by the publisher 104 or by the keyword mapping service 120 (e.g., based on performance data provided by the publisher 104).

Here and throughout, terms such as "user," "advertiser," "publisher," "visitor," and so forth are to be understood in the broadest possible sense. Herein, the term "user" is used generically to refer to advertisers, publishers, and visitors. By way of illustration and not of limitation, an "advertiser" may be an individual or a commercial, government, or non-profit entity; may be directly responsible for placing an advertisement, announcement, message, or the like, or may be a broker, reseller, or intermediary for another's advertisements, announcements, messages, or the like; may be advertising for its own products and services or may be advertising on behalf of another; may be represented by a human agent or by a web service, software agent, or other programmatic construct, etc. Likewise, a "publisher" is not restricted to persons or entities who purport to be in the on-line publishing business (or any other kind of publishing business), nor to entities who have complete or even primary control over the content of particular websites; but rather is used in a more general sense. In the context of Internet-based advertising, for example, "publisher" includes any person or entity responsible directly or indirectly for putting content on the Internet, whether by hosting or sponsoring websites, posting pages, frames, graphics, applets, blogs, audiovisual content, etc., on their own or others' websites, providing web services that can source content for websites, or in any other manner. Still further, a "visitor" may be an individual who visits and views or otherwise perceives the content of a web site and pages therein via a web browser or other client software program running on a personal computer, wireless handheld device, or the like, but may also be, for example, a corporate or other entity whose servers access published web content and advertisements by invoking web services through appropriate application programming interfaces (APIs); a "visitor" may or may not be the intended or actual end consumer of a product or service that is the subject of an advertisement, etc. A "potential customer" may be an individual who views advertising, regardless of the media in which it is published (e.g., print, television, on-line, etc), and may or may not be the intended or actual end consumer of a product or service that is the subject of an advertisement, etc. In sum, persons of skill in the art will appreciate that a wide variety of actors, more than can be conveniently set forth here, can play the roles of "advertiser," "publisher," and "visitor" for purposes of the present invention. It will be further appreciated that the selfsame person or entity may be both "publisher" and "advertiser," or both "publisher" and "visitor," or both "advertiser" and "visitor", or even all three, depending on the context. In a similar vein, and as will be apparent from the foregoing, terms such as "web page," "website," and so forth are used to give specific illustrative examples of settings in which on-line content and advertisements can be presented to and perceived by users. Such examples are not intended to be limiting, and persons of skill in the art will appreciate that many other such settings now known or yet to be developed may be suitable to the practice of the present invention in specific embodiments.

It should be noted that although flow charts may be provided herein to show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule-based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs. It is to be understood that any method steps as recited herein (e.g., in the claims) may be performed by a configuration utility (e.g., Java™-based) executed by a computing device based on input by a user. Of course, according to various alternative embodiments, any suitable configuration utility, application, system, computing device, etc. may be used to execute, implement and/or perform method steps as recited in this disclosure (including the claims).

The invention is described above with reference to drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, PROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention are described in the general context of method steps which may be implemented in one embodiment by a program product including machine-executable instructions, such as program code, for example, in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet, and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules, and other data for the computer.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A method of associating an advertisement with a web page, comprising:
    under control of one or more computer systems configured with executable instructions,
        identifying web pages associated with potential queries using a search engine;
        performing a mapping operation to obtain a map of the web pages as a function of the potential queries;
        performing a reverse mapping operation to obtain a grouping of potential queries as a function of one of the web pages;
        selecting an active query from the grouping of potential queries, the active query comprising a selected query from the grouping of potential queries, selected based at least in part on weights assigned to each potential query of the grouping of potential queries according to a relevance score provided by the search engine; and
        alternating the active query from among the grouping of potential queries based at least in part on the assigned weights, thereby providing each of the other of the potential queries of the grouping of potential queries as the active query to an advertising service to associate an advertisement with the web page.

2. The method of claim 1, further comprising:
    providing the advertisement for publication with the web page based at least in part on the active query in response to a request for the web page.

3. The method of claim 1, wherein identifying the web pages associated with the potential queries using a search engine comprises:
    providing the potential queries as inputs to the search engine; and
    receiving a list of associated web pages for each potential query and a relevance score for each of the associated web pages.

4. The method of claim 1, further comprising:
    searching a database to identify past queries submitted to the search engine by users and corresponding search result web pages; and
    selecting the potential queries from the past queries based at least in part on whether the corresponding search result web pages include advertisements.

5. The method of claim 1, wherein selecting the active query from the grouping of potential queries to associate the advertisement with the web page comprises:
    assigning the weight to each of the potential queries, wherein the weight determines a number of requests for the web page for which the potential query is active.

6. The method of claim 5, wherein the weights are assigned to each of the potential queries based at least in part on an estimated financial performance for each of the potential queries.

7. The method of claim 5, wherein assigning the weights to each of the potential queries comprises using a relevance score determined by the search engine to estimate a click-through-rate for each of the potential queries.

8. The method of claim 5, further comprising:
    measuring an actual click-through-rate for each of the potential queries; and
    adjusting the weights for each potential query based at least in part on the actual click-through-rate.

9. The method of claim 1, wherein the potential queries are keywords for associating the advertisement with the web page.

10. The method of claim 1, wherein the potential queries comprise possible candidates for queries to be used in place of search terms.

11. A system for associating an advertisement with a web page, comprising:
    a search engine configured to identify web pages associated with potential queries;
    a mapping engine configured to determine a grouping of the potential queries associated with one of the web pages;
    an optimization engine configured to select an active query from the grouping of potential queries to associate an advertisement with the web page, to alternate selection of the active query from among the grouping of potential queries, and to assign a weight to each of the potential queries, wherein the weight determines a number of requests for the web page for which the potential query is active, wherein the alternate selection of the active query from among the grouping of potential queries is based at least in part on the assigned weights; and
    a web server configured to provide the web page in response to a request for the web page, wherein the web page includes an advertisement provided from an advertisement database based at least in part on the active query.

12. The system of claim 11, further comprising:
    a communication network coupled to the advertisement database and the web server.

13. The system of claim 11, wherein the search engine is further configured to:
    receive the potential queries as inputs; and
    provide a list of associated web pages for each potential query and a relevance score for each of the associated web pages.

14. The system of claim 11, further comprising a searchable database configured to:
    facilitate identification of past queries submitted to the search engine by users and corresponding search result web pages; and
    facilitate selection of the potential queries from the past queries based at least in part on whether the corresponding search result web pages include advertisements, wherein the potential queries comprise possible candidates for queries to be used in place of search terms.

15. The system of claim 11, wherein the optimization engine is configured to assign the weights to each of the potential queries based at least in part on a performance metric for each of the potential queries.

16. The system of claim 11, wherein the optimization engine is configured to assign the weights to each of the potential queries based at least in part on a relevance score determined by the search engine and used to estimate the financial performance of each of the potential queries.

17. The system of claim 11, wherein the optimization engine is further configured to:
measure an actual click-through-rate for each of the potential queries; and
adjust the weights for each potential query based at least in part on the actual click-through-rate.

18. The system of claim 11, wherein the potential queries are keywords for associating the advertisement with the web page.

19. The system of claim 11, wherein the web page includes information regarding at least one of a product and a service.

20. A method of associating an advertisement with a content-based web page, comprising:
under control of one or more computer systems configured with executable instructions,
receiving one or more search terms via a search engine;
providing potential queries as inputs to the search engine, wherein the potential queries comprise possible candidates for queries for use in place of the one or more search terms;
receiving a list of associated web pages for each potential query and a relevance score for each of the associated web pages, the relevance score indicating a degree to which each web page is associated with each potential query;
determining a grouping of the potential queries associated with one of the web pages;
assigning a weight to each of the potential queries of the grouping of potential queries based at least in part on a performance metric for each of the potential queries of the grouping, wherein the weight determines a number of requests for the web page for which the potential query is active, and wherein the performance metric is based on the relevance score;
selecting an active query from the grouping of potential queries based at least in part on the assigned weights to associate an advertisement with the content-based web page; and
alternating the active query from among the grouping of potential queries based at least in part on the assigned weights to provide each of the other of the potential queries of the grouping of potential queries as the active query.

21. The method of claim 20, further comprising:
providing the advertisement for publication with the web page based at least in part on the active query in response to a request for the web page.

22. The method of claim 20, further comprising:
searching a database to identify past queries submitted to the search engine by users and corresponding search result web pages; and
selecting the potential queries from the past queries based at least in part on whether the corresponding search result web pages include advertisements.

23. The method of claim 20, further comprising:
estimating a click-through-rate for each of the potential queries using the relevance score.

24. The method of claim 20, further comprising:
measuring an actual click-through-rate for each of the potential queries; and
adjusting the weights for each potential query based at least in part on the actual click-through-rate.

25. The method of claim 20, wherein the performance metric is further based at least in part on an estimated cost-per-click.

26. A system for associating an advertisement with a web page, comprising:
a search engine configured to receive potential queries as inputs and to provide a list of associated web pages for each potential query and a relevance score for each of the associated web pages, the potential queries comprising search terms that previously resulted in at least one advertisement being presented and clicked on by a user;
a mapping engine configured to determine a grouping of the potential queries associated with one of the web pages;
an optimization engine configured to select an active query from the grouping of potential queries to associate an advertisement with the web page;
a communication network coupled to an advertisement database and a web server for providing the advertisement for publication with the web page based on the active query in response to a request for the web page; and
a searchable database configured to facilitate identification of past queries submitted to the search engine by users and corresponding search result web pages, and further configured to facilitate selection of the potential queries based at least in part on whether the corresponding search result web pages include advertisements.

27. The system of claim 26, wherein the searchable database is further configured to facilitate selection of the potential queries based at least in part on a click-through rate for any advertisements included in the corresponding search result web pages.

28. The system of claim 26, wherein the optimization engine is further configured to:
assign a weight to each of the potential queries based at least in part on a performance metric for each of the potential queries, wherein the weight determines a number of requests for the web page for which the potential query is active; and
alternate the active query from among the grouping of potential queries based at least in part on the assigned weights to provide each of the other of the potential queries of the grouping of potential queries as the active query.

29. The system of claim 26, wherein the optimization engine is configured to assign weights to each of the potential queries based at least in part on the relevance score determined by the search engine, and wherein the relevance score is used to estimate a click-through-rate for each of the potential queries.

30. The system of claim 26, wherein the optimization engine is further configured to:
measure an actual click-through-rate for each of the potential queries; and
adjust the weights for each potential query based at least in part on the actual click-through-rate.

31. A method of associating an advertisement with a web page, comprising:
under control of one or more computer systems configured with executable instructions,
determining a grouping of potential queries associated with a web page, the potential queries comprising search terms that previously resulted in at least one advertisement being presented and clicked on by a user;
assigning a weight to each potential query of the group of potential queries based at least in part on a performance metric for each of the potential queries using an optimization engine, wherein the weight determines a number of requests for the web page for which the potential query is active;

alternately selecting an active query from the grouping of potential queries based at least in part on the assigned weights to associate an advertisement with the web page;

obtaining an advertisement to provide with the web page based at least in part on the active query;

measuring the performance metric over a period of time; and adjusting the weights for each potential query based at least in part on the measured performance metric, the performance metric comprising an estimated financial performance based on a combination of a click-through rate and a cost-per-click.

32. A method of associating an advertisement with searchable content, comprising:

under control of one or more computer systems configured with executable instructions, identifying searchable content items associated with potential queries using a search engine, wherein the potential queries comprise search terms that previously resulted in at least one advertisement being presented and clicked on by a user;

obtaining, via a mapping operation, a map of a grouping of the searchable content items as a function of the potential queries;

obtaining, via a reverse mapping operation, a grouping of potential queries as a function of one of the searchable content items in the grouping of searchable content items;

selecting an active query from the grouping of potential queries, the active query comprising a selected query from the grouping of potential queries, selected based at least in part on weights assigned to each potential query of the grouping of potential queries according to a relevance score provided by the search engine, the relevance score indicating a degree to which each web page is associated with each potential query;

alternating the active query from among the grouping of potential queries based at least in part on the assigned weights, thereby providing each of the other of the potential queries of the grouping of potential queries as the active query to an advertising service to associate an advertisement with the searchable content item; and adjusting the weights for each potential query based at least in part on a measured performance metric comprising an estimated financial performance based on a combination of the relevance score and a cost-per-click.

33. The system of claim 11, wherein the optimization engine is configured to assign the weights to each of the potential queries based at least in part on a combination of a relevance score provided by the search engine and a cost-per-click of each of the potential queries.

* * * * *